US012137667B2

(12) United States Patent
Wu et al.

(10) Patent No.: US 12,137,667 B2
(45) Date of Patent: Nov. 12, 2024

(54) FOLDABLE LITTER BOX AND LITTER BOX WITH VARIABLE VOLUME

(71) Applicant: JINHUA JIU MIAO ENTERPRISE MANAGEMENT CO., LTD., Jinhua (CN)

(72) Inventors: Xia Wu, Jinhua (CN); Zhiyu Tang, Jinhua (CN); Kaiyan Wu, Jinhua (CN)

(73) Assignee: JINHUA JIU MIAO ENTERPRISE MANAGEMENT CO., LTD.

( * ) Notice: Subject to any disclaimer, the term of this patent is extended or adjusted under 35 U.S.C. 154(b) by 89 days.

(21) Appl. No.: 18/110,901

(22) Filed: Feb. 17, 2023

(65) Prior Publication Data

US 2024/0188532 A1 Jun. 13, 2024

(30) Foreign Application Priority Data

Dec. 12, 2022 (CN) .......................... 202223342097.3

(51) Int. Cl.
*A01K 1/01* (2006.01)

(52) U.S. Cl.
CPC .................................. *A01K 1/0125* (2013.01)

(58) Field of Classification Search
CPC .................................................. A01K 1/0125
See application file for complete search history.

(56) References Cited

U.S. PATENT DOCUMENTS

| 4,305,544 | A | * | 12/1981 | Noonan | B65D 5/30 119/168 |
| 4,667,622 | A | * | 5/1987 | Breault | A01K 1/0107 119/165 |
| 5,060,849 | A | * | 10/1991 | King | B65D 5/0005 229/175 |
| 5,080,044 | A | * | 1/1992 | Bosworth | A01K 1/0125 119/168 |
| 5,203,282 | A | * | 4/1993 | Hasiuk | A01K 1/0125 119/168 |
| 5,249,550 | A | * | 10/1993 | Hines | B65D 5/0005 229/101 |
| 5,294,043 | A | * | 3/1994 | Platt | B65D 5/6629 229/128 |
| 5,645,212 | A | * | 7/1997 | Potter | B65D 5/64 229/148 |
| 5,845,601 | A | * | 12/1998 | Robinson | A01K 1/0125 119/168 |
| 6,698,382 | B1 | * | 3/2004 | Blaszak | A01K 1/0125 119/168 |

(Continued)

*Primary Examiner* — Yvonne R Abbott-Lewis (57) ABSTRACT

A foldable litter box and a litter box with a variable volume are provided. The foldable litter box includes a bottom plate and a several side plates integrally formed with the bottom plate, the side plates can be bended relative to the bottom plate to enclose a housing cavity. The side plates includes a front baffle and a rear baffle, as well as a left baffle and right baffle. The foldable litter box also includes connection plates integrally formed with the front baffle and the rear baffle, and the connection plates can be bent and connected to the left baffle and the right baffle respectively. The litter box can be quickly transformed into a pet litterbox with different volume from a flat state to different folded states, and the litter box can be quickly returned to the flat state when not in use, thus reducing space occupation.

20 Claims, 8 Drawing Sheets

(56) References Cited

U.S. PATENT DOCUMENTS

| | | | |
|---|---|---|---|
| 7,748,348 B2 * | 7/2010 | Hurwitz | A01K 1/0107 |
| | | | 119/168 |
| 8,869,744 B2 * | 10/2014 | Noonan | A01K 1/0125 |
| | | | 119/168 |
| 11,617,344 B2 * | 4/2023 | Kauffman, II | A01K 1/0125 |
| | | | 119/168 |
| 2004/0200890 A1 * | 10/2004 | Mesly | A01K 1/0125 |
| | | | 229/101 |

* cited by examiner

FOLDABLE LITTER BOX AND LITTER BOX WITH VARIABLE VOLUME

TECHNICAL FIELD

The present disclosure relates to a technical field of portable pet litter boxes, and in particular to a foldable litter box and a litter box with variable volume.

BACKGROUND

Litter boxes are essential when keeping pets, and it is also needed to carry a litter box when pet owners have an overnight outing with their pets, or during pet fostering on holidays, or when pets are hospitalized.

However, current litter boxes are basically molded via plastic, involving a large size and a shortage of being not convenient enough for storage, transportation and use.

SUMMARY

At least one objective of the present disclosure, is to provides a foldable litter box to solve the problem of current litter boxes consuming a large space and involving inconvenient transportation.

In one aspect, the present disclosure provides a foldable litter box, including: a bottom plate and a left baffle, a right baffle, a front baffle and a rear baffle integrally extending from periphery of the bottom plate and being foldable about the periphery of the bottom plate, the left baffle and the right baffle being configured opposite to each other, the front baffle and the rear baffle being configured opposite to each other; the bottom plate, the left baffle, the right baffle, the front baffle and the rear baffle enclosing a housing cavity; wherein the foldable litter box further includes a front connection plate and a rear connection plate, the front connection plate being integrally formed with the front baffle and being foldable about the front baffle to connect to the left baffle and the right baffle, the rear connection plate being integrally formed with the rear baffle and being foldable about the front baffle to connect to the left baffle and the right baffle.

In one embodiment, the bottom plate is provided with a bottom fold line connecting to the front baffle and the rear baffle, the bottom plate being symmetrical along the bottom fold line; the front baffle being provided with a front fold line, a front first fold line, a front second fold line, a front third fold line, and a front fourth fold line, the front fold line connecting to the bottom plate and extending in a direction away from the bottom plate, the front baffle being divided into a front first part and a front second part symmetrically along the front fold line, the front first fold line and the front second fold line being crossed together to equally divide the front first part, the front third fold line and the front fourth fold line being crossed together to equally divide the front second portion, the front first fold line being connected to the front fold line at an end adjacent to the bottom plate, the front third fold line being connected to the front fold line at an end adjacent to the bottom plate; the rear baffle being provided with a rear fold line, a rear first fold line, a rear second fold line, a rear third fold line, and a rear fourth fold line, the rear fold line connecting to the bottom plate and extending in a direction away from the bottom plate, the rear baffle being divided into a rear first portion and a rear second portion symmetrically along the rear fold line, the rear first fold line and the rear second fold line being crossed together to equally divide the rear first portion, the rear third fold line and the rear fourth fold line being crossed together to equally divide the rear second portion, the rear first fold line being connected to the rear fold line at an end adjacent to the bottom plate, the rear third fold line being connected to the rear fold line at an end adjacent to the bottom plate.

In one embodiment, the foldable litter box further includes a flap foldable about and connected to the left baffle, the flap configured to overlap the right baffle after the front baffle being folded about the front first fold line and the rear baffle being folded about the rear first fold line.

In one embodiment, the left baffle is provided with a plurality of notches at an end away from the bottom plate, the plurality of notches being configured to form a U-shaped indentation, with two opposite ends of the indentation both extending to periphery of the left baffle.

In one embodiment, the foldable litter box further includes a front adhesive and a rear adhesive, the front connection plate being bonded to the left baffle and the right baffle respectively through the front adhesive, and the rear connection plate being bonded to the left baffle and the right baffle respectively through the rear adhesive. In one embodiment, the foldable litter box further includes a scratching member, the scratching member being placed in the housing cavity, the scratching member including a flat surface in contact with the bottom plate and a non-flat surface away from the bottom plate.

In one embodiment, the non-flat surface is an arched surface or a wavy surface.

In one embodiment, the foldable litter box is rectangular-shaped, the number of the scratching members is two, the scratching member being half of a height of the foldable litter box, with a width being half of a width of the foldable litter box, and a length being equal to a length of the foldable litter box.

In one embodiment, the notches extend along a thickness direction through the left baffle, the plurality of notches being spaced apart from each other.

In one embodiment, the foldable litter box is made of paper or plastic.

On another aspect, the present disclosure further provides a litter box with variable volume, including a bottom plate and a plurality of side plates foldable about and extending from periphery of the bottom plate, the bottom plate being provided with at least one bottom fold line parallel to one of the side plates adjacent to the bottom fold line, the bottom fold line extending to opposite sides of the bottom plate respectively; the side plates including a front baffle and a rear baffle connecting to two opposite sides of the bottom fold line, and a left baffle and a right baffle located on another two opposite sides of the bottom fold line respectively; the front baffle and rear baffle being provided with a side fold line extending collinearly from the bottom fold line when the litter box is unfolded, and a first fold line extending from opposite ends of the bottom fold line at an angulation with the side fold line. The litter box has a first folded state and a second folded state. Herein, in the first folded state, each of the side plates are folded about the periphery of the bottom plate towards a same side of the bottom plate and connected end-to-end around the periphery of the bottom plate and enclosing a first cavity having a first volume with the bottom plate, with a connection plate extending from a lateral edge of at least one of the side plates and being foldable towards another one of the side plates adjacent to the connection plate, the connection plate being removably connected to the side plates adjacent thereto. In the second folded state, the bottom plate are divided along the bottom fold line into a support portion and a foldable plate located between the support portion and the left baffle or right baffle; the foldable plate being folded about the bottom fold line and the front baffle and rear baffle being folded about the first fold line, respectively, the foldable plate overlapping the side fold line and connecting to the front baffle, rear baffle, and the right baffle or left baffle opposite to the foldable plate, to form a second cavity having a second volume with the support portion.

In one embodiment, in the second folded state, the right baffle or left baffle adjacent to the foldable plate is further folded about the foldable plate to form a cover lid above the second cavity and being opposite to the support portion.

In one embodiment, the foldable plate has a width along a direction perpendicular to the bottom fold line equal to a length of the side fold line.

In one embodiment, the first fold line is a diagonal line of a square with the side fold line as a side.

In one embodiment, cover lid has an area at least equal to an area of the support portion, the litter box further including a flap further foldable about and extending from a side of the cover lid away from the foldable plate; in the second folded state, the flap is folded about the cover lid towards the support portion.

In one embodiment, the litter box further includes a tearable U-shaped indentation formed on the cover lid, the U-shaped indentation being formed by a plurality of notches.

In one embodiment, the notches run through the cover lid in a direction of a thickness of the cover lid and the plurality of the notches are spaced apart from each other.

In one embodiment, the litter box is made of paper or plastic.

In one embodiment, the litter box further includes a scratching member, the scratching member being placed in the first cavity or the second cavity, the scratching member including a flat surface in contact with the bottom plate and a non-flat surface away from the bottom plate.

In one embodiment, in the first folded state, the connection plate is adhesively bonded to adjacent side plates.

The present disclosure at least possesses following beneficial effects.

When it is needed to assemble a litter box, reference steps can be as follows.

In step I, the front connection plate is folded about the front baffle, the rear connection plate is folded about the rear baffle, the front connection plate and the front connection plate are folded towards the same side of the bottom plate; in step II, the left baffle, the right baffle, the front baffle and the rear baffle are folded towards the same side of the bottom plate to form a housing cavity; and in step III, the front connection plate is connected to the left baffle and the right baffle, and the rear connection plate is connected to the left baffle and the right baffle, thus the foldable litter box is completed. When the litter box is not needed, the litter box can be disassembled into an original flat state by reversing the above steps, thus reducing the space occupied by the litter box.

BRIEF DESCRIPTION OF DRAWINGS

In order to more clearly illustrate the technical solutions in the embodiments of the present disclosure, the following will briefly describe the accompanying drawings used in the description of the embodiments. Obviously, the accompanying drawings in the following description are only some embodiments of the present disclosure. For a person of ordinary skill in the art, other drawings may be obtained from these drawings without creative effort.

DETAILED DESCRIPTION OF EMBODIMENTS

To make the objectives, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

References of "embodiments" in the disclosure mean that a particular feature, structure, or characteristic described in connection with an embodiment may be included in at least one embodiment of this application. A Phrase in different paragraph of the specification does not necessarily mean the same embodiment, nor is it a separate or alternative embodiment that is mutually exclusive with other embodiments. It should be understood that, both explicitly and implicitly, by those skilled in the art that the embodiments described herein may be combined with other embodiments.

Embodiments are described below.

Figure 1:
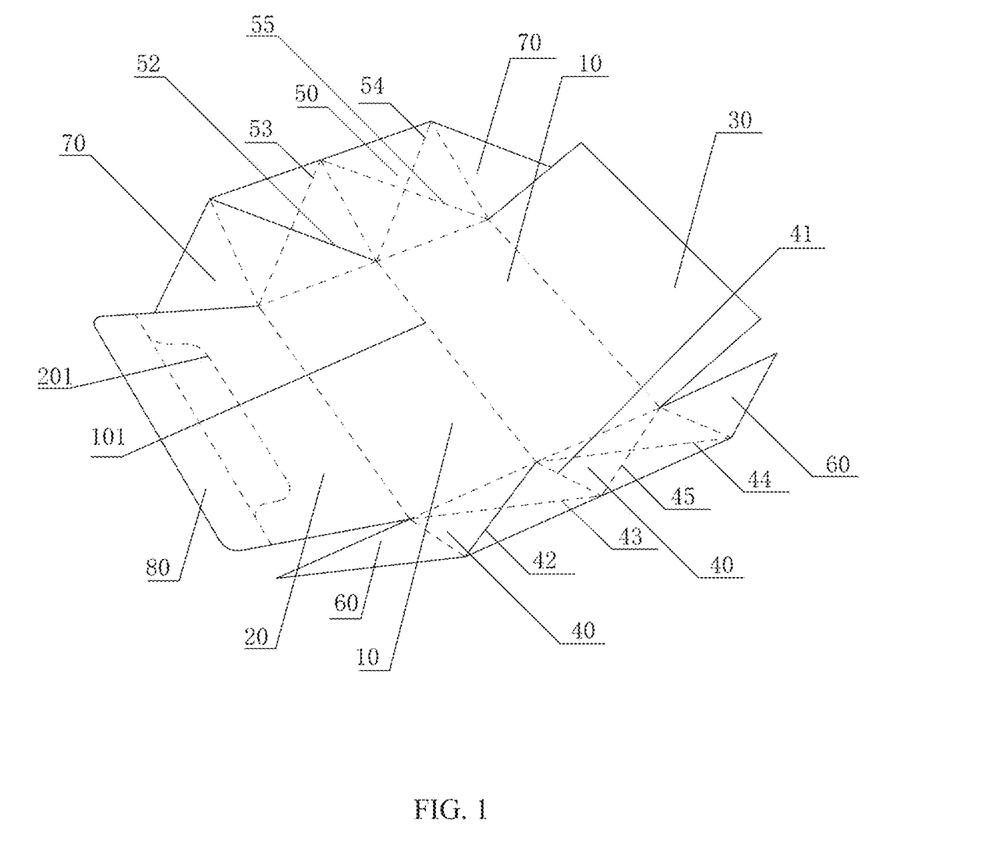
FIG. 1 is a schematic diagram of a structure of a foldable litter box in an unfolded state according to an embodiment of the present disclosure.
Figure 2:
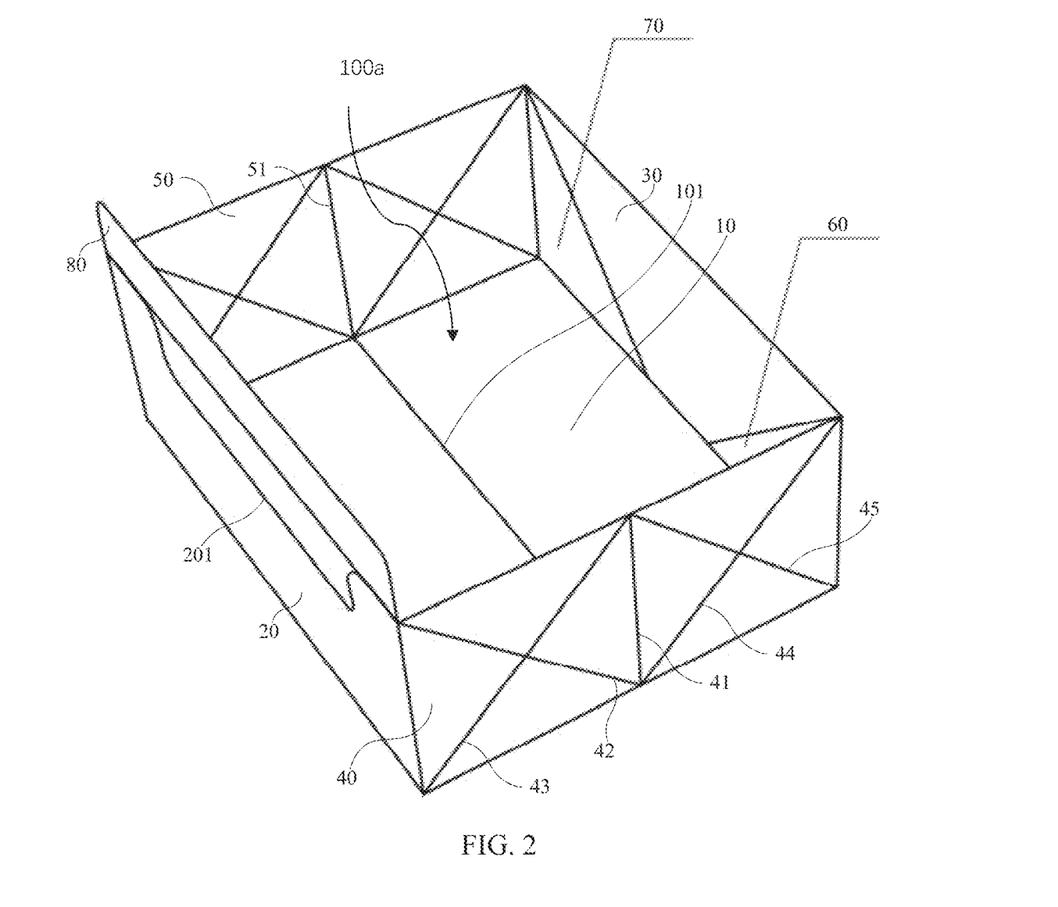
FIG. 2 is a schematic diagram of a structure of the foldable litter box in a folded state according to an embodiment of the present disclosure.
Figure 3:
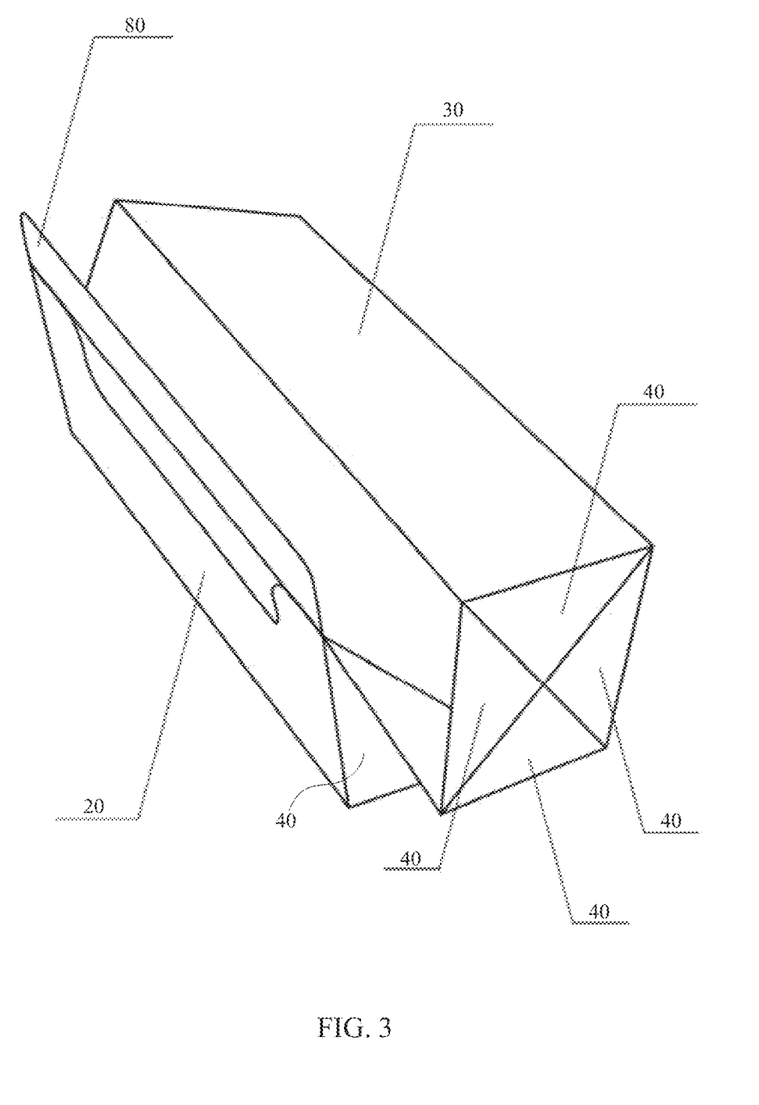
FIG. 3 is a schematic diagram of the structure of the foldable litter box in an intermediate state according to another embodiment of the present disclosure.
Figure 4:
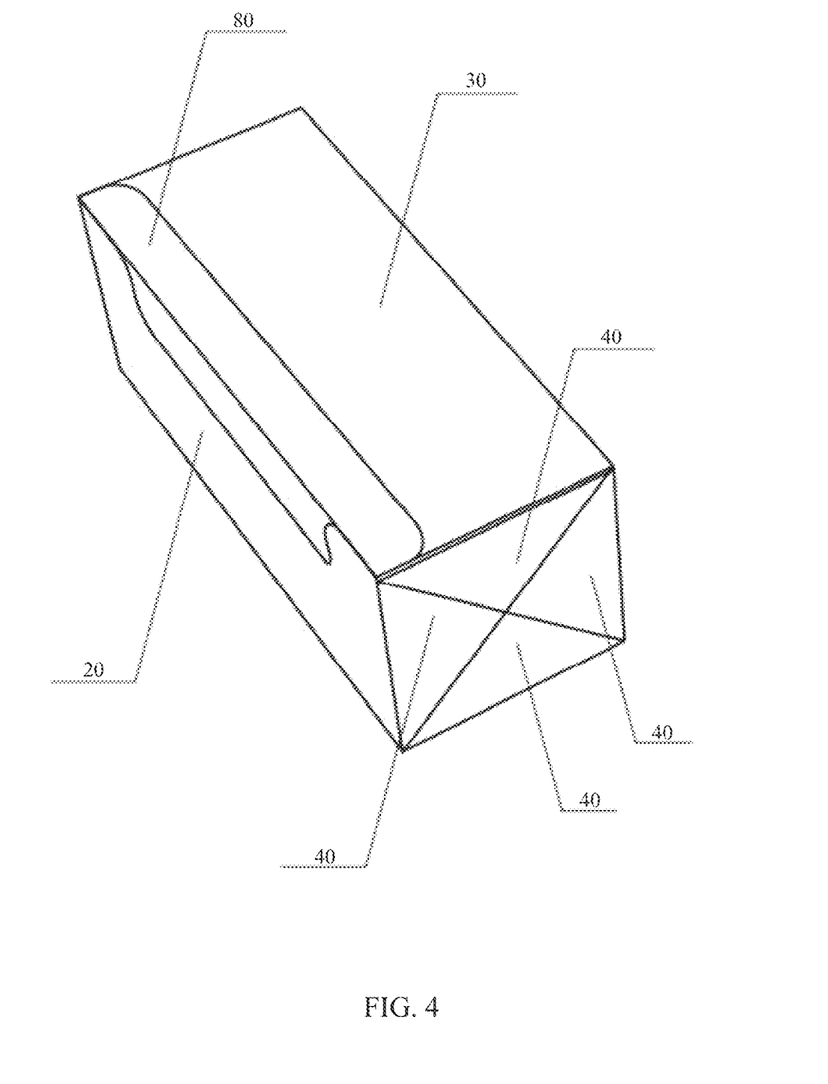
FIG. 4 is a schematic diagram of a structure of the foldable litter box provided by the present disclosure in another folded state under one embodiment.

Referring to FIGS. 1 to 4, FIG. 1s a schematic diagram of a structure of a foldable litter box in an unfolded state according to an embodiment of the present disclosure, FIG. 2 is a schematic diagram of a structure of the foldable litter box in a folded state according to an embodiment of the present disclosure, FIG. 3 is a schematic diagram of the structure of the foldable litter box in a intermediate state according to another embodiment of the present disclosure, and FIG. 4 is a schematic diagram of a structure of the foldable litter box provided by the present disclosure in a folded state under one embodiment.

The foldable litter box of the present disclosure can be formed by folding a one-piece structure as shown in FIG. 1, made of paper or plastic in a planar shape. The foldable litter box of the present disclosure includes: a bottom plate 10 and a plurality of side plates integrally formed with the bottom plate 10 and foldable about the bottom plate. The side plates include a left baffle 20, a right baffle 30, a front baffle 40 and a rear baffle 50, with fold lines between the bottom plate 10 and any one of the left baffle 20, the right baffle 30, the front baffle 40, and the rear baffle 50, respectively. The left baffle 20, and right baffle 30 are located on opposite sides of the bottom plate 10, respectively, while the front baffle 40 and the rear baffle 50 are located on the other two sides of the bottom plate 10, and the four side plates are connected to four edges of the bottom plate 10, the left baffle 20 and the right baffle 30 are opposite to each other, the front baffle 40 and the rear baffle 50 are opposite to each other. The bottom plate 10, the left baffle 20, the right baffle 30, the front baffle 40 and the rear baffle 50 enclose a housing cavity, where cat litter, other toys, decorations and other items can be placed in. The foldable litter box also includes a front connection plate 60 and a rear connection plate 70, the front connection plate 60 is integrally formed with the front baffle 40 and being foldable about the front baffle 40 to connect to the left baffle 20 and the right baffle 30 respectively, with fold lines formed between the front connection plate 60 and the front baffle 40 and configured on the edges of the two ends of the front baffle 40. The rear connection plate 70 is integrally formed with the rear baffle 50 and being foldable about the rear baffle 50 to connect to the left baffle 20 and the right baffle 30 respectively, with fold lines formed between the rear connection plate 70 and the rear baffle 50 and configured on the edges of the two ends of the rear baffle 50. The front connection plate 60 and the rear connection plate 70 function for connection and also work to support the foldable litter box.

In order to provide a further understanding of the technical solution of the embodiment to one skilled in the art, folding steps will be explained specifically as follows, without limitation to the scope of protection of the disclosure. In step I, the front connection plate 60 is folded about the front baffle 40, the rear connection plate 70 is folded about the rear baffle 50, the front connection plate 60 and the front connection plate 70 are folded towards the same side of the bottom plate 10; in step II, the left baffle 20, the right baffle 30, the front baffle 40 and the rear baffle 50 are folded towards the same side of the bottom plate 10 to form a housing cavity; and in step III, the front connection plate 60 is connected to the left baffle 20 and the right baffle 30, and the rear connection plate 70 is connected to the left baffle 20 and the right baffle 30, thus the foldable litter box is achieved.

In the present embodiment, when it is needed to assemble a litter box, the aforementioned folding steps can be referred to fold the foldable litter box as shown in FIG. 1 to obtain a three-dimensional litter box as shown FIG. 2. When the litter box is not needed, the three-dimensional litter box can be disassembled into the original flat state by reversing the above folding steps, thus reducing the space occupied by the litter box.

The front connection plate 60 may be adhesively bonded to the left baffle 20 and the right baffle 30 respectively, and the rear connection plate 70 may be adhesively bonded to the left baffle 20 and the right baffle 30 respectively. Specifically, the foldable litter box further includes a front adhesive and a rear adhesive, the front adhesive is provided between the front connection plate 60 and the left baffle 20, and between the front connection plate 60 and the right baffle 30, and the front connection plate 60 is adhesively bonded to the left baffle 20 and the right baffle 30 respectively via the front adhesive. The rear adhesive is provided between the rear connection plate 70 and the left baffle 20, and between the rear connection plate 70 and the right baffle 30, and the rear connection plate 70 is adhesively bonded to the left baffle 20 and the right baffle 30 respectively via the rear adhesive. The front adhesive can be double-sided adhesive sticker or glue, and the rear adhesive can also be double-sided adhesive sticker or glue. The connection between the front connection plate 60 and the left baffle 20 or the right baffle 30 can also be achieved through plug, snap or the like, and the connection between the rear connection plate 70 and the left baffle 20 or the right baffle 30 can also be achieved through plug, snap or the like.

In a further embodiment, the bottom plate 10 is provided with a bottom fold line 101 extending from an edge of the bottom plate 10 adjacent to the front baffle 40 to the rear baffle 50, the bottom plate 10 being symmetrical along the bottom fold line 101 which divides the bottom plate 10 equally into two parts.

The front baffle 40 is provided with a front fold line 41, a front first fold line 42, a front second fold line 43, a front third fold line 44 and a front fourth fold line 45, the front fold line 41 connecting to the bottom fold line 101 and extending in a direction away from the bottom plate 10. The front baffle 40 is divided into a front first part and a front second part symmetrically along the front fold line 41, and the front first part and the front second part can completely overlap each other when the front baffle 40 is folded about the front fold line 41. The front first fold line 42 and the front second fold line 43 are crossed together to equally divide the front first part, and the front third fold line 44 and the front fourth fold line 45 are crossed together to equally divide the front second portion, the front first fold line 42 being connected to the front fold line 41 at an end adjacent to the bottom plate 10. The front third fold line 44 are connected to the front fold line 41 at an end adjacent to the bottom plate 10.

The rear baffle 50 are provided with a rear fold line 51, a rear first fold line 52, a rear second fold line 53, a rear third fold line 54, and a rear fourth fold line 55, the rear fold line 51 connecting to the bottom fold line 101 and extending in a direction away from the bottom plate 10, the rear baffle being divided into a rear first portion and a rear second portion symmetrically along the rear fold line 51, the rear first fold line 52 and the rear second fold line 53 being crossed together to equally divide the rear first portion, the rear third fold line 54 and the rear fourth fold line 55 being crossed together to equally divide the rear second portion, the rear first fold line 52 being connected to the rear fold line 51 at an end adjacent to the bottom plate 10, the rear third fold line 54 being connected to the rear fold line 51 at an end adjacent to the bottom plate 10.

In the present embodiment, as shown in FIGS. 3-4, the foldable litter box can be folded about the bottom fold line 101, the front first fold line 42 and the rear first fold line 52, into a structure with a half volume of the structure shown in FIG. 2, thus further saving half of the original space, in addition to forming a closed storage cavity to prevent debris from entering. Similarly, the foldable litter box can also be folded about the bottom fold line 101, the front third fold line 44, and the rear third fold line 54 into a structure with the half volume.

Further, the foldable litter box further includes a flap 80 foldable about and connected to the left baffle 20, the flap 80 is configured to overlap the right baffle 30 after the front baffle 40 is folded about the front first fold line 42 and the rear baffle 50 is folded about the rear first fold line 52. The flap 80 is connected to the right baffle 30, and the flap 80 functions as a transition member to connect the left baffle 20 and the right baffle 30 into a whole, preventing the right baffle 30 from moving in the direction away from the left baffle 20 and increasing the stability of the foldable litter box after folded.

A plurality of notches 201 are formed at one end of the left baffle 20 away from the bottom plate 10, and the plurality of notches 201 are configured to form a U-shaped indentation, with two opposite ends of the indentation separately extending to periphery of the left baffle 20. The left baffle 20 can be torn to form a U-shaped opening, and the U-shaped opening can reduce the height of the foldable litter box at the left baffle 20 to facilitate an access for pets to get into the housing cavity.

The notch 201 runs through the left baffle 20 in a thickness direction of the left baffle 20, and plurality of notches 201 are spaced apart from each other so that at least part of the U-shaped indentation is hollow, and the user can connect multiple notches 201 by tearing along the indentation, thereby facilitating the user operation.

Figure 5:
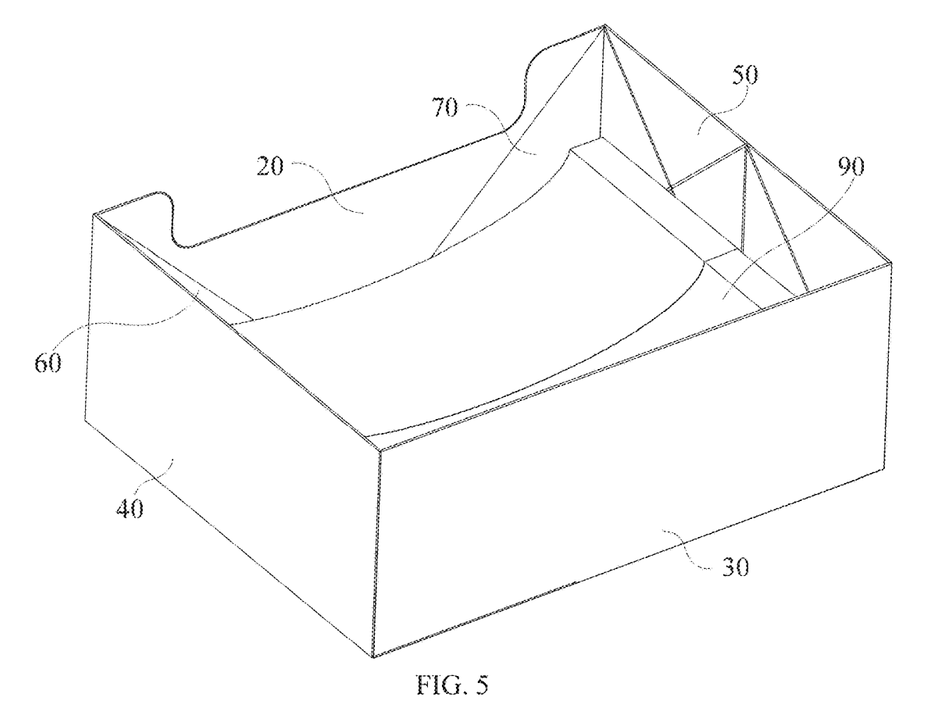
FIG. 5 is a schematic diagram of the structure of the foldable litter box in another folded state according to another embodiment of the present disclosure.
Figure 6:
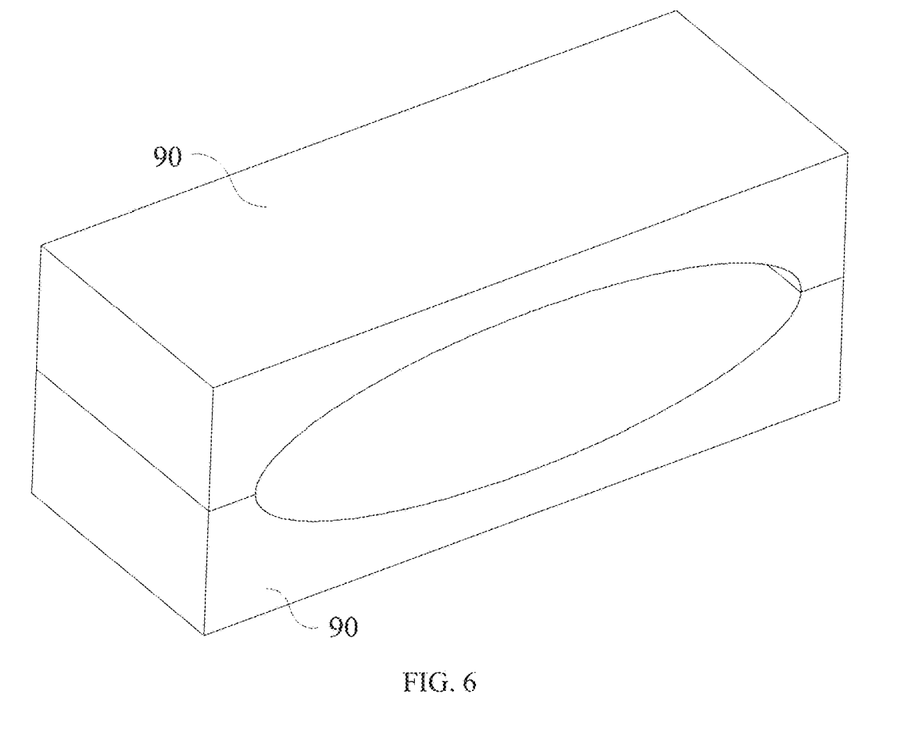
FIG. 6 is a schematic diagram of a structure of a scratching member according to another embodiment of the present disclosure.
Figure 7:
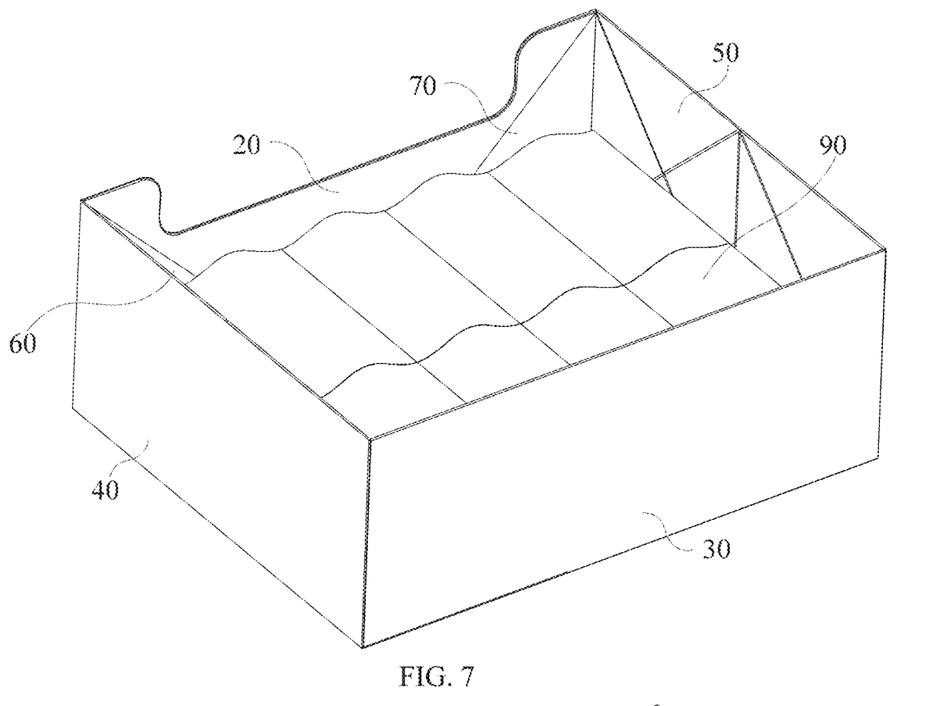
FIG. 7 is a schematic diagram of a structure of the foldable litter box in another folded state according to another embodiment of the present disclosure.
Figure 8:
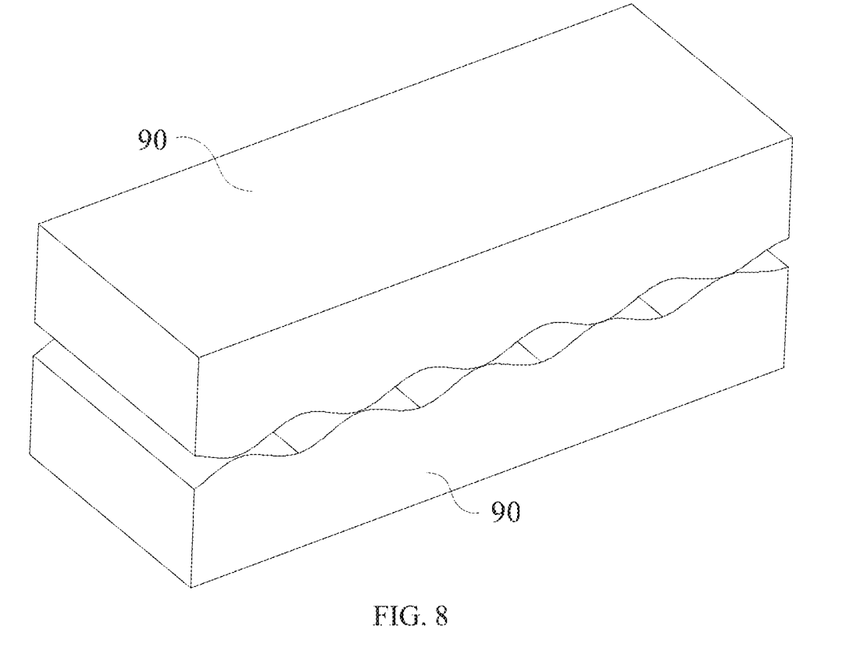
FIG. 8 is a schematic diagram of a structure of the scratching member according to another embodiment of the present disclosure.

Referring to FIGS. 5-8, FIG. 5 is a schematic diagram of the structure of the foldable litter box in another folded state according to another embodiment of the present disclosure; FIG. 6 is a schematic diagram of a structure of a scratching member 90 according to another embodiment of the present disclosure; FIG. 7 is a schematic diagram of a structure of the foldable litter box in another folded state according to another embodiment of the present disclosure; and FIG. 8 is a schematic diagram of a structure of the scratching member 90 according to another embodiment of the present disclosure.

The foldable litter box also includes a scratching member 90, the scratching member 90 is placed in the housing cavity, and the scratching member 90 includes a flat surface in contact with the bottom plate 10 and a non-flat surface away from the bottom plate 10. The non-flat surface may have an appearance of a pit, thus guiding the pet to play with the scratching member 90 in the foldable litter box.

As shown in FIGS. 5 and 6, the side of the scratching member 90 away from the bottom plate 10 may be an arched surface, and as shown in FIGS. 7 and 8, the side of the scratching member 90 away from the bottom plate 10 may also be a wavy surface.

The foldable litter box is rectangular-shaped, the number of scratching members 90 is two, the height of a single scratching members 90 is half of the height of the foldable litter box, the width of the scratching members 90 is half of the width of the foldable litter box, and the length of the scratching members 90 is equal to the length of the foldable litter box. The length, height, and width of the scratching member in the present embodiment are only an approximate configuration, not an absolute numerical limitation, and there may be a 5% difference, such as errors in the numerical relationship caused by thickness or assembling clearances.

When the foldable litter box is in the folded state as shown FIG. 2, the two scratching members 90 are placed adjacent to each other with the arched or wavy surface facing upward, so that the pet can play on the scratching members 90; when the foldable litter box is in the state shown in FIG. 4, the two scratching members 90 can be stacked into the foldable litter box after being placed opposite each other as in shown FIGS. 6 and 8, and the two scratching members 90 can completely fill the foldable litter box, so that they can have a supporting function.

Figure 9A:
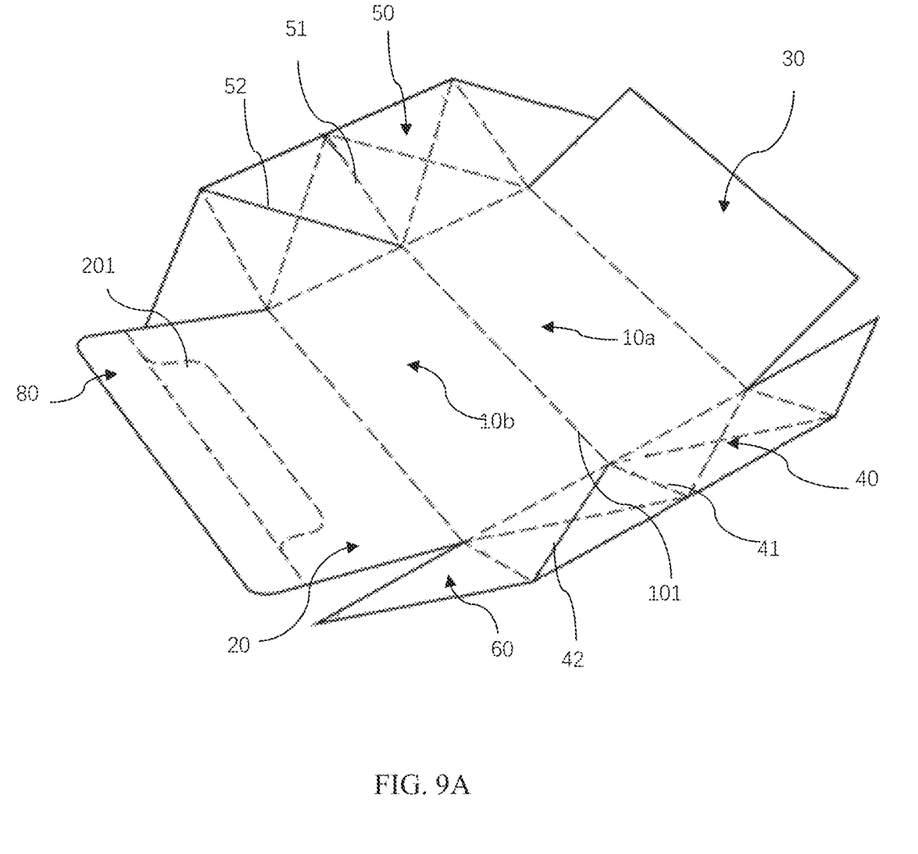
FIGS. 9A-9B are schematic diagrams of the litter box with variable volume provided in another embodiment of the present disclosure in different states.
Figure 9B:
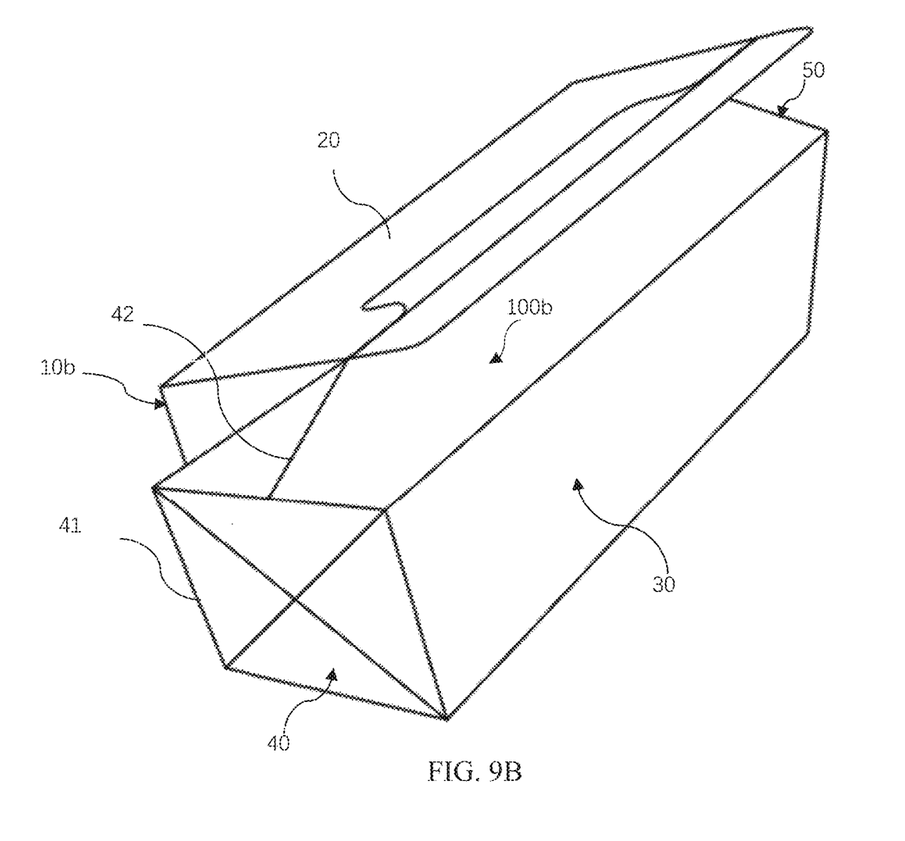

A further embodiment of the present disclosure provides a litter box with variable volume as shown in FIGS. 9A-9B.

The litter box includes a bottom plate 10 and a plurality of side plates 20/30/40/50 foldable about and extending from periphery of the bottom plate 10. The bottom plate 10 is provided with at least one bottom fold line 101 parallel to one of the side plates adjacent to the bottom fold line 101. As shown in FIG. 9A, the bottom fold line 101 is parallel to the side plate 20. The bottom fold line 101 extends to opposite sides of the bottom plate 10, the side plates include: a front baffle 40 and a rear baffle 50, connecting to opposite ends of the bottom fold line 101; and a left baffle 20 and a right baffle 30, located on opposite sides of the bottom fold line 101 separately. The litter box is in a one-piece flat structure in an unfolded state as shown FIG. 9A, and the front plate 40 and the rear plate 50 have side fold lines 41&51 extending collinearly from the bottom fold line 101 when the litter box is in the unfolded state, and first fold lines 42&52 extending from the end of the bottom fold line 101 at an angle with respect to the side fold lines 41&51, respectively. Specifically, the first fold line 42 extends from the end of the bottom fold line 101 with respect to the side fold line 41, while the first fold line 52 extends from the other end of the bottom fold line 101 with respect to the side fold line 51.

The litter box includes a first folded state and a second folded state, and the litter box has different volume in different folded states.

In the first folded state, as shown in FIG. 9A and FIG. 2, each of the side plates 20-50 is folded about the periphery of the bottom plate 10 towards a same side of the bottom plate 10 and is connected end-to-end around the periphery of the bottom plate 10 and encloses a first cavity 100a having a first volume with the bottom plate 10. A connection plate 60/70 extends from a lateral edge of at least one of the side plates and being foldable towards another one of the side plates adjacent to the connection plate, and the connection plate is removably connected to the side plates adjacent to the connection plate. As shown in FIGS. 9A-9B, the litter box includes two connection plates 60 extending from opposite ends of the front baffle 40, and two connection plates 70 extending from opposite ends of the rear baffle 50. Optionally, in the first folded state, the connection plates 60/70 are adhesively bonded to the adjacent the side plates, respectively.

As shown in FIGS. 9A-9B, in the second folded state, the bottom plate 10 is divided by the bottom fold line 101 into a support portion 10a and a foldable plate 10b located between the support portion 10a and the left baffle 20. It should be understood that the foldable plate 10b may also be located between the support portion 10a and the right baffle 30.

As shown in FIG. 9B, the foldable plate 10b is folded about the bottom fold line 101, and the front baffle 40, which is connected to the bottom fold line 101, is folded about the first fold line 42, while the rear baffle 50 is folded about the first fold line 52, so that the foldable plate 10b can overlap the side fold lines 41&51. Thus, the foldable plate 10b is connected to the front baffle 40, the rear baffle 50 and the right baffle 30 opposite to the foldable plate 10b, further enclosing a second cavity 100b having a second volume with the support portion 10a.

Optionally, in the second folded state, the right baffle 20 adjacent to the foldable plate 10b is further folded about the foldable plate 10b to form a cover lid above the second cavity 100b and being opposite to the support portion 10a.

Optionally, the foldable plate 10b has a width w along the direction perpendicular to the bottom fold line 101, equal to the length of the side fold line 41/51. The first fold line 42/52 is a diagonal line of a square with the side fold line 41/51 as a side.

Optionally, corresponding to the area of the lid (i.e., the left baffle 20) is at least equal to the area of the support portion 10a, and the litter box further includes a flap 80 further foldable about and extending from a side of the cover lid 20 away from the foldable plate 10b; in the second folded state, the flap 80 is folded about the edge of the cover lid towards the support portion 10a.

Optionally, the litter box further includes a tearable U-shaped indentation 201 formed on the cover lid 20, the U-shaped indentation being formed by a plurality of notches. The notches run through the lid 20 in the direction of the thickness of the cover lid and the plurality of notches are spaced apart from each other.

Similar with the litter box shown in FIGS. 1-8, the litter box with variable volume in this embodiment is made of paper or plastic. The litter box also includes a scratching member 90 as shown in FIGS. 5-8, the scratching member 90 being placed in the first cavity 100a or the second cavity 100b, the scratching member 90 having a flat surface on one side in contact with the support 10a and a non-flat surface on the other side away from the support 10a, such as a curved or wavy surface. The scratching member 90 in the litter box with variable volume may share the same structure with the scratching member as shown in FIGS. 5-8.

In the description of the present disclosure, it should be understood that, terms such as "first" and "second" are used herein for purposes of description and are not intended to indicate or imply relative importance or significance or to imply the number of indicated technical features. Thus, the feature defined with "first" and "second" may comprise one or more of the features. In the description of the present disclosure, the term "a plurality of" means two or more than two, unless specified otherwise.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above", or "on top of" a second feature may include an embodiment in which the first feature is right or obliquely "on", "above", or "on top of" the second feature, or just means that the first feature is at a height higher than that of the second feature; while a first feature "below", "under", or "on bottom of" a second feature may include an embodiment in which the first feature is right or obliquely "below", "under" or "on bottom of" the second feature, or just means that the first feature is at a height lower than that of the second feature.

In the description of the present specification, the terms "an embodiment", "some embodiments", "an example", "a specific example", "some examples" or the like mean that a particular feature, structure, material, or characteristic described in connection with the embodiment or example is included in at least one embodiment or example of the present disclosure. In the specification, the appearances of the above-mentioned terms are not necessarily referring to the same embodiment or example. Furthermore, the particular features, structures, materials, or characteristics described can be combined in any suitable manner in one or more embodiments or examples.

References of "embodiments" in the disclosure mean that a particular feature, structure, or characteristic described in connection with an embodiment may be included in at least one embodiment of this application. A Phrase in different paragraph of the specification does not necessarily mean the same embodiment, nor is it a separate or alternative embodiment that is mutually exclusive with other embodiments. It should be understood that, both explicitly and implicitly, by those skilled in the art that the embodiments described herein may be combined with other embodiments.

Although embodiments of the present disclosure have been shown and illustrated, it shall be understood by those skilled in the art that the above embodiments are exemplary and cannot be construed to limit the present disclosure; various changes, modifications, alternatives, and variants can be made in the embodiments without departing from the scope of the present disclosure.

What is claimed is:

1. A foldable litter box, comprising:
a bottom plate and a left baffle, a right baffle, a front baffle and a rear baffle integrally extending from periphery of said bottom plate and being foldable about the periphery of the bottom plate, the left baffle and the right baffle being configured opposite to each other, the front baffle and the rear baffle being configured opposite to each other, the bottom plate, the left baffle, the right baffle, the front baffle and the rear baffle enclosing a housing cavity; wherein the foldable litter box further comprises a front connection plate and a rear connection plate, the front connection plate being integrally formed with the front baffle and being foldable about the front baffle to connect to the left baffle and the right baffle, the rear connection plate being integrally formed with the rear baffle and being foldable about the rear baffle to connect to the left baffle and the right baffle.

2. The foldable litter box according to claim 1, wherein, the bottom plate is provided with a bottom fold line connecting to the front baffle and the rear baffle, the bottom plate being symmetrical along the bottom fold line;
the front baffle being provided with a front fold line, a front first fold line, a front second fold line, a front third fold line, and a front fourth fold line, the front fold line connecting to the bottom fold line and extending in a direction away from the bottom plate, the front baffle being divided into a front first part and a front second part symmetrically along the front fold line, the front first fold line and the front second fold line being crossed together to equally divide the front first part, the front third fold line and the front fourth fold line being crossed together to equally divide the front second portion, the front first fold line being connected to the front fold line at an end adjacent to the bottom plate, the front third fold line being connected to the front fold line at an end adjacent to the bottom plate;
the rear baffle being provided with a rear fold line, a rear first fold line, a rear second fold line, a rear third fold line, and a rear fourth fold line, the rear fold line connecting to the bottom fold line and extending in a direction away from the bottom plate, the rear baffle being divided into a rear first portion and a rear second portion symmetrically along the rear fold line, the rear first fold line and the rear second fold line being crossed together to equally divide the rear first portion, the rear third fold line and the rear fourth fold line being crossed together to equally divide the rear second portion, the rear first fold line being connected to the rear fold line at an end adjacent to the bottom plate, the rear third fold line being connected to the rear fold line at an end adjacent to the bottom plate.

3. The foldable litter box according to claim 2, wherein, the foldable litter box further comprises: a flap foldable about and connected to the left baffle, the flap configured to overlap the right baffle after the front baffle being folded about the front first fold line and the rear baffle being folded about the rear first fold line.

4. The foldable litter box according to claim 1, wherein, the left baffle is provided with a plurality of notches at an end away from the bottom plate, the plurality of notches being configured to form a U-shaped indentation, with two opposite ends of the indentation both extending to periphery of the left baffle.

5. The foldable litter box according to claim 1, wherein, the foldable litter box further comprises a front adhesive and a rear adhesive, the front connection plate being bonded to the left baffle and the right baffle respectively through the front adhesive, and the rear connection plate being bonded to the left baffle and the right baffle respectively through the rear adhesive.

6. The foldable litter box according to claim 1, wherein, the foldable litter box further comprises a scratching member, the scratching member being placed in the housing cavity, the scratching member comprising a flat surface in contact with the bottom plate and a non-flat surface away from the bottom plate.

7. The foldable litter box according to claim 6, wherein, the non-flat surface is an arched surface or a wavy surface.

8. The foldable litter box according to claim 6, wherein, the foldable litter box is rectangular-shaped, the number of the scratching members is two, the scratching member being half of a height of the foldable litter box, with a width being half of a width of the foldable litter box, and a length being equal to a length of the foldable litter box.

9. The foldable litter box according to claim 4, wherein, the notches extend along a thickness direction through the left baffle, the plurality of notches being spaced apart from each other.

10. The foldable litter box according to claim 1, wherein, the foldable litter box is made of paper or plastic.

11. A litter box with variable volume, comprising a bottom plate and a plurality of side plates foldable about and extending from periphery of the bottom plate, the bottom plate being provided with at least one bottom fold line parallel to one of the side plates adjacent to the bottom fold line, the bottom fold line extending to opposite sides of the bottom plate; the side plates comprising a front baffle and a rear baffle connecting to opposite ends of the bottom fold line, and a left baffle and a right baffle located on opposite sides of the bottom fold line; the front baffle and rear baffle being provided with a side fold line extending collinearly from the bottom fold line when the litter box is unfolded, and a first fold line extending from opposite ends of the bottom fold line at an angle with respect to the side fold line; the litter box having a first folded state and a second folded state; wherein, in the first folded state, each of the side plates being folded about the periphery of the bottom plate towards a same side of the bottom plate and connected end-to-end around the periphery of the bottom plate and enclosing a first cavity having a first volume with the bottom plate, with a connection plate extending from a lateral edge of at least one of the side plates and being foldable towards another one of the side plates adjacent to the connection plate, the connection plate being removably connected to the side plates adjacent to the connection plate;

in the second folded state, the bottom plate being divided by the bottom fold line into a support portion and a foldable plate located between the support portion and the left baffle or right baffle; the foldable plate being folded about the bottom fold line, and the front baffle and rear baffle being folded about the first fold line, the foldable plate overlapping the side fold line and connecting to the front baffle, rear baffle, and the right baffle or left baffle opposite to the foldable plate, to enclose a second cavity having a second volume with the support portion.

12. The litter box with variable volume according to claim 11, wherein, in the second folded state, the right baffle or left baffle adjacent to the foldable plate is further folded about the foldable plate to form a cover lid above the second cavity and being opposite to the support portion.

13. The litter box with variable volume according to claim 12, wherein, the foldable plate has a width along a direction perpendicular to bottom fold line, equal to a length of the side fold line.

14. The litter box with variable volume according to claim 12, wherein, the first fold line is a diagonal line of a square with the side fold line as a side.

15. The litter box with variable volume according to claim 12, wherein, the cover lid has an area at least equal to an area of the support portion, the litter box further comprising a flap further foldable about and extending from a side of the cover lid away from the foldable plate; in the second folded state, the flap is folded about the cover lid towards the support portion.

16. The litter box with variable volume according to claim 15, wherein, the litter box further comprises a tearable U-shaped indentation formed on the cover lid, the U-shaped indentation being formed by a plurality of notches.

17. The litter box with variable volume according to claim 15, wherein, the notches run through the cover lid in a direction of a thickness of the cover lid and the plurality of the notches are spaced apart from each other.

18. The litter box with variable volume according to claim 11, wherein, the litter box is made of paper or plastic.

19. The litter box with variable volume according to claim 11, wherein, the litter box further comprises a scratching member, the scratching member being placed in the first cavity or the second cavity, the scratching member comprising a flat surface in contact with the bottom plate and a non-flat surface away from the bottom plate.

20. The litter box with variable volume according to claim 11, wherein, in the first folded state, the connection plate is adhesively bonded to adjacent side plates.

* * * * *